United States Patent
Wenner

(10) Patent No.: US 6,431,411 B1
(45) Date of Patent: Aug. 13, 2002

(54) APPARATUS AND RELATED METHOD FOR CONTINUOUSLY RELEASING A LIQUID

(76) Inventor: Manfred E. Wenner, Luitpoldstrasse 7, D-97082 Würzburg (DE)

(*) Notice: Subject to any disclaimer, the term of this patent is extended or adjusted under 35 U.S.C. 154(b) by 0 days.

(21) Appl. No.: 09/786,422
(22) PCT Filed: Jul. 22, 1999
(86) PCT No.: PCT/DE99/02310
§ 371 (c)(1), (2), (4) Date: Feb. 23, 2001
(87) PCT Pub. No.: WO00/06940
PCT Pub. Date: Feb. 10, 2000

(30) Foreign Application Priority Data

Jul. 30, 1998 (DE) .................................. 198 34 338

(51) Int. Cl.$^7$ ................................................ B67D 5/42
(52) U.S. Cl. ..................................... 222/386; 184/105.1
(58) Field of Search .......................... 222/340, 386; 184/45.1, 54, 105.1, 105.2

(56) References Cited

U.S. PATENT DOCUMENTS

| | | | | | |
|---|---|---|---|---|---|
| 3,498,413 A | * | 3/1970 | Krieger | ...................... | 184/45.1 |
| 4,018,305 A | * | 4/1977 | Tietje | ...................... | 184/45.1 |
| 5,598,902 A | * | 2/1997 | Lin | ...................... | 184/45.1 |

* cited by examiner

Primary Examiner—William C. Doerrler
Assistant Examiner—Thach H. Bui
(74) Attorney, Agent, or Firm—Edwin D. Schindler

(57) ABSTRACT

A sensor for continuously releasing a liquid, such as a lubricant, over an adjustable period of time, includes a reservoir from which the liquid is ejected by a movable working plunger. The working plunger is moved with a driving force transmitted from a power transmitter, which is connected to a brake plunger and which counteracts the driving force with a brake force by reducing the volume of a chamber filled with a paste-like liquid and ejecting the liquid. The paste-like liquid is then pressed through a tube, which can then be cut therethrough.

21 Claims, 1 Drawing Sheet

APPARATUS AND RELATED METHOD FOR CONTINUOUSLY RELEASING A LIQUID

BACKGROUND OF THE INVENTION

1. Technical Field of the Invention

Figure 1:
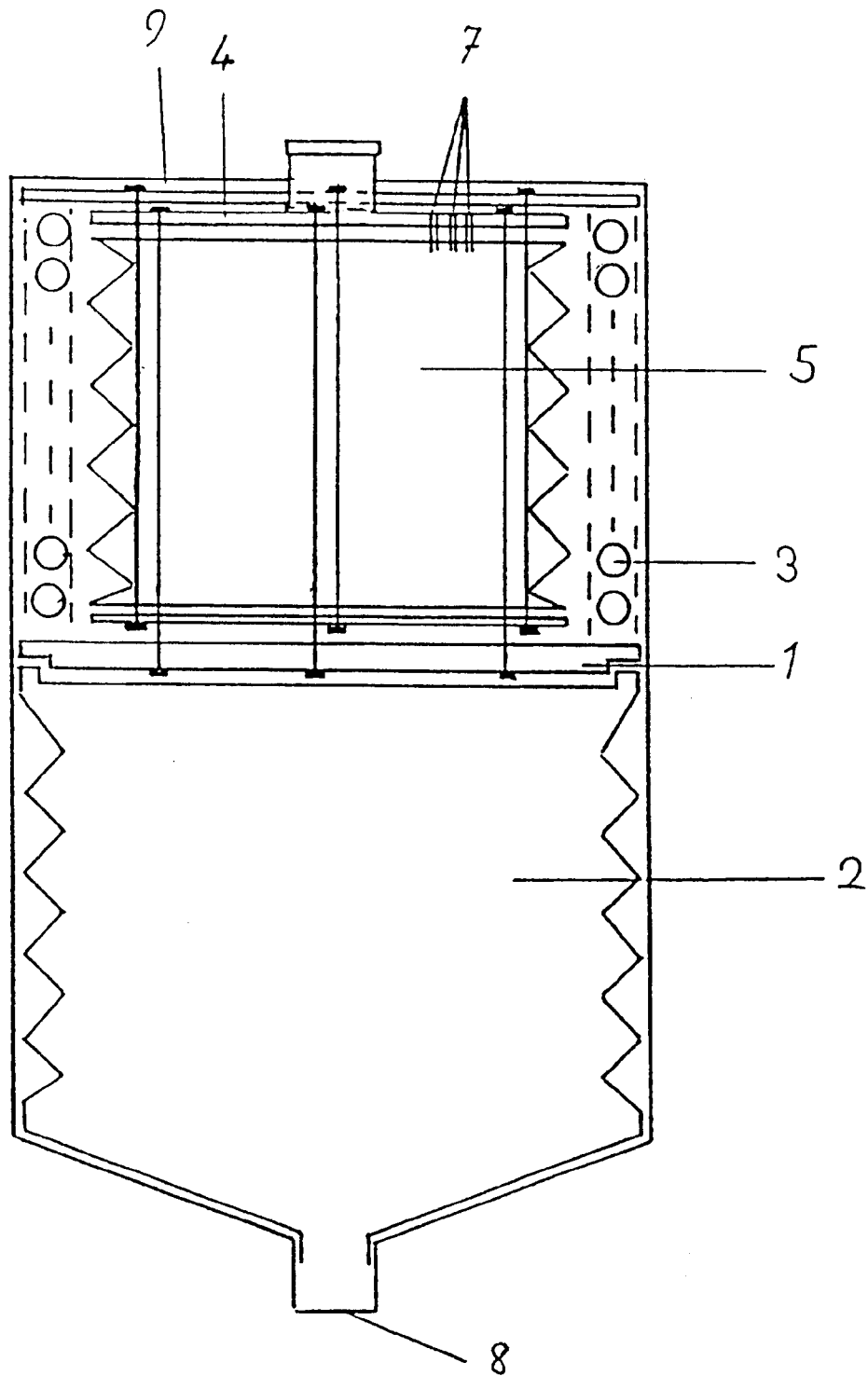

The invention relates to a sensor for continuously releasing a liquid, especially a lubricant, over an adjustable period of time. The liquid is ejected from a reservoir by a moveable working plunger. The working plunger is moved with the driving force transmitted from a power transmitter, said power transmitter being mechanically connected to a brake plunger which counteracts the driving force with a brake force by reducing the volume of a chamber filled with a paste-like liquid and ejecting the liquid.

2. Description of the Prior Art

Such sensors are known, for example, from Federal Republic of Germany Patent Application No. 195 09 247. They are used for the continuous and measured release of liquids over a long period of time which is adjustable and, as a rule, ranges over several months. Their most important area of application is the release of substances for permanent lubrication of bearings. The released liquid's viscosity can be comparatively great—as, for example, in the case of lubricant greases—and extend to the viscosity of plastic mass. A force generated by a spring presses the liquid, especially the lubricant, from a reservoir. To achieve a continuous, nearly uniform release, the spring force is compensated by a counter-force which is generated to press a paste-like liquid—especially a silicone mixture—from a chamber. Upon increasing the spring's relief rate, the counter-force increases so that, upon a specific relief rate, a balance of forces is established on the spring. Thus, a specified period of discharge results, the adjustment of which presently entails considerable expenditure. There are various possibilities for this, such as replacing the spring, replacing the chamber causing the counter-force, or the paste-like liquid. All these methods have in common that they are rather time-consuming and cannot be performed without the corresponding replacement elements on location at the customer's place of business.

SUMMARY OF THE INVENTION

The invention is thus based on the task of providing a sensor whose discharge period is swiftly adjustable by auxiliary means which are easy to carry along.

This task is solved according to the invention such that the paste-like liquid is pressed through a tube that can be cut through.

According to the proposal, the flow resistance is formed by a tube which can be shortened to adjust the discharge period. The mode of action is as follows: the shorter the tube, the smaller the counter-force acting against the driving force—at a given driving speed, i.e. at a given rate of flow through the tube. Since the counterforce increases due to the flow resistance at an increasing drive speed, a balance of forces is achieved at a higher speed. Then, the discharge process runs faster. By cutting through the tube, thus accordingly shortening the tube, the discharge period is continuously adjustable by simple means and with little time required. Here, the brake plunger can be connected directly or indirectly with the power transmitter, for example, via the working plunger. "Tube"—within the meaning of the invention—is understood to mean an oblong body in whose longitudinal direction the liquid is moving. Its cross-section may be random, for example in the form of a circle or a polygon. On the inside, the tube may be additionally provided with resistance bodies. It is also possible to attach several tubes on the chamber which can all be shortened, if necessary, for adjusting the discharge period. Conceivable are rigid or flexible tubes, the last mentioned having the advantage that they can be bent or even rolled up. Thus, upon shortening over a greater length, the downstream front end of the tube can be positioned precisely to enable a defined collection of the discharging paste-like liquid. The great length here enables great adjustment precision and a wide adjustment interval.

In one embodiment of the invention, the tube has a constant cross-section over its total length. In this case, the resulting counter-force is nearly proportional to the length of the tube and, in a laminar flow, it is also approximately proportional to the flow-through speed. From this results an approximate proportionality between discharge period and tube length which considerably simplifies the adjustment.

However, the tube diameter may also change; it may especially decrease in the paste-like liquid's direction of flow. The shorter the tube, the smaller the minimum flow-through cross-section. Upon shortening the tube, the discharge period thus decreases disproportionately versus the tube length, so that a wide adjustment range is already possible with relatively short tubes.

As paste-like liquids, silicones or silicone mixtures have until now proved to be especially suitable whose consistence can be adapted depending on the operating conditions. Due to the diversity of such substances, just about all conceivable conditions can be covered. Moreover, the composition of a silicone mixture will also provide a viscosity adjustment, so that additional adjustment possibilities for the discharge period will result.

In an advantageous further development of the invention, the downstream front end of the tube is connected to a collection vessel. The ejected substances are thus not released so that there will be no possible contaminations due to the paste-like liquid and its re-use will be possible. In any event, however, the paste-like liquid can be better subjected to a recycling process or a disposal if it is specifically collected and thus only slightly burdened with contaminations.

Other characteristics of the invention contribute to the sensor's simple design and compact construction. Concerning the arrangement of working plunger and reservoir, it is proposed that the working plunger shortens the reservoir on the rear side in direction of the driving force and that the liquid is released on the front side. Thus, the arrangement of the outlet opening is largely independent of the sensor's internal structure since the driving force applies from the opposite side, and the design in the area of the outlet opening remains unaffected thereby.

For its implementation, particularly two possibilities will result, i.e. one with bellows whose downstream rear end is displaced with its surfaces as parallel as possible to enable specific and complete ejection. Alternatively, the reservoir can also be designed as a cylinder, and the working plunger designed as a cooperating piston which presses the liquid out.

Two preferred embodiments are proposed for a spatial arrangement of power transmitter, reservoir and chamber. One is to forwardly arrange the reservoir which is open in direction of the driving force, and to arrange the power transmitter behind it. As a rule, there will be sufficient space, in this case, next to the power transmitter to provide the chamber there. However, a coaxial arrangement of power transmitter, reservoir and chamber is especially preferred in which the power transmitter moves in axial direction and is formed as a spring surrounding the chamber on the outside. For power transmission, the brake plunger can be advantageously connected to the power transmitter, indirectly via the working plunger, for example, via a rod which penetrates the chamber in axial direction.

Another concept also prefers a coaxial arrangement of power transmitter, reservoir and chamber in which the driving force applies in axial direction. However, in this case, the reservoir is radially surrounded outside by the chamber and by the power transmitter arranged behind the chamber in direction of the driving force which enables direct power transmission from the power transmitter to the chamber without further auxiliary means. In contrast, power transmission to the reservoir is rendered more difficult. Yet, even this compact arrangement enables a simple structure of the sensor.

In an advantageous embodiment of the invention, the brake plunger displaces the chamber's rear side in direction of the driving force so that paste-like liquid is pressed through the tube due to the volume reduction. Simultaneously, the displaced volume outside the chamber will be free and can be filled, for example, with the discharged paste-like liquid. Thus, the tube can advantageously be attached to the rear side of the chamber and the paste-like liquid can be expelled into the vacated volume. Since the brake plunger presses in direction of the driving force, no power transmission mechanism will be required which is susceptible to repairs.

Like the reservoir, the chamber can also be designed as bellows or in a piston cylinder arrangement. In the bellows design, the brake plunger moves the rear side in direction of the driving force. However, a piston cylinder arrangement is preferred since the space—displaced by the plunger's movement relative to the cylinder—can be used, if suitably designed, as a collecting vessel for the paste-like liquid. To achieve relative movement, either the cylinder can be fixed and the piston be moved over the brake plunger, or the piston is fixed and the cylinder is moved over the brake plunger. In the last case, if the power transmitter is arranged next to the chamber, the power transmission will be simplified since—for forming the brake plunger—the connecting elements to the power transmitter need only be formed on the cylinder. The power transmitter can be formed especially as a spring.

The power transmitter is preferably designed such that the driving force is approximately constant over the entire movement of the working cylinder. Thus, without additional compensation mechanisms, a uniform discharge speed of the reservoir can be achieved.

According to the forms of embodiments so far described, an extension of the adjusted discharge period is not possible since the tube's shortening will always result in a faster discharge. Thus, the invention provides—in one advantageous embodiment—to separably attach the tube to the chamber so that it can be replaced by a longer one. An already shortened tube can thus be replaced by a longer one; however, the exchange can also be for a tube which—due, for example, to a different cross-section distribution—permits a different adjustment range for the discharge period.

Furthermore, a method for the manufacture of the sensor according to the invention is proposed with the sensor first being provided with a tube of maximum length so that all adjustment possibilities of the discharge period are open. Only subsequently—for example, at the customer's on location or even by the customer himself—there will be an adjustment to the desired discharge period by cutting off a downstream front piece of the tube. Thus, except for the easily performable step of shortening the tube, sensors can be produced by a uniform method, for different discharge periods. No further explanation will be necessary with regard to the fact that this will result in considerable economic benefits. The tube can be shortened either by the sales personnel or even by the customer himself.

Another process characteristic relates to sensors where the tube is detachably connected to the chamber. For an adjustment of the discharge period, it is suggested to remove the tube and replace it by another.

BRIEF DESCRIPTION OF THE DRAWING FIGURE

Further details, characteristics and benefits of the invention can be taken from the following descriptive part in which one example of an embodiment of the invention will be described in detail on the basis of the drawing. It shows in diagrammatic presentation a sectional view of a liquid sensor according to the invention.

DETAILED DESCRIPTION OF THE DRAWING AND PREFERRED EMBODIMENTS

The sensor contains a reservoir (2), in the form of bellows in this case, from which grease is pressed out through an outlet opening (8) located on the bottom. A working plunger (1) presses on the top side of the reservoir (2), as presented in the figure. This working plunger is moved by a power transmitter (3) formed as a spring in this case, and the plunger thus ejects the grease. To ensure a gradual, controlled discharge, a brake plunger (4) counteracts the driving force generated by the power transmitter (3); the brake plunger being indirectly connected to the power transmitter (3) by a mechanical connection with the working plunger (1). To generate the brake force, the brake plunger (4) presses on a chamber (5) which is filled with silicone and is formed as bellows which discharge via tubes (7) attached on the side of the brake plunger (4). So that the bellows forming the chamber (5) do not evade the action effect of the brake plunger (4), its bottom side is fixed to the upper housing wall (9) of the sensor. The silicone pressed out top-side through the tubes (7) passes into the volume vacated by compression of the chamber (5).

The brake plunger (4) counters the driving force by a force which increases with the deformation speed until an approximate balance of forces is given. By shortening the tubes (7), the counter-force can be reduced at a given drive speed so that a higher deformation speed will come about. In this manner, the period can be adjusted which is needed for discharging the reservoir (2) filled with grease.

I claim:

1. An apparatus for continuously releasing a liquid over an adjustable period of time, comprising:

a reservoir for a liquid;

a movable working plunger for ejecting the liquid from said reservoir;

a brake plunger continuously applied for preventing a pre-determined amount of the liquid in said reservoir from being exceeded;

a tube capable of being cut therethrough;

a power transmitter for transmitting a driving force for moving said movable working plunger, said power transmitter being connected to said brake plunger for counteracting the driving force with a braking force by reducing the volume of a chamber filled with a paste-like liquid and ejecting the liquid therefrom; and, means for pressing said paste-like liquid through said tube.

2. The apparatus for continuously releasing a liquid over an adjustable period of time according to claim 1, wherein said tube is flexible.

3. The apparatus for continuously releasing a liquid over an adjustable period of time according to claim 1, wherein said tube has a constant cross-section over its entire length.

4. The apparatus for continuously releasing a liquid over an adjustable period of time according to claim 1, wherein said tube has a non-constant, or varying, cross-section over its entire length.

5. The apparatus for continuously releasing a liquid over an adjustable period of time according to claim 4, wherein the cross-section of said tube decreases in a direction of flow of said paste-like liquid.

6. The apparatus for continuously releasing a liquid over an adjustable period of time according to claim 1, wherein said paste-like liquid includes silicone.

7. The apparatus for continuously releasing a liquid over an adjustable period of time according to claim 1, further comprising a collecting vessel with a downstream front end of said tube being connected to said collecting vessel.

8. The apparatus for continuously releasing a liquid over an adjustable period of time according to claim 1, wherein said movable working plunger reduces said reservoir on a rear side in a direction of the driving force and presses out the liquid through an outlet opening arranged on a side which is front, in direction, of the driving force.

9. The apparatus for continuously releasing a liquid over an adjustable period of time according to claim 1, wherein said reservoir is a bellows, which is reduced on its rear side, in a direction of the driving force, by movement of said movable working plunger.

10. The apparatus for continuously releasing a liquid over an adjustable period of time according to claim 1, wherein said reservoir is a cylinder and said movable working plunger is a piston working together with said cylinder.

11. The apparatus for continuously releasing a liquid over an adjustable period of time according to claim 8, wherein said reservoir, said chamber and said power transmitter are arranged in substantially coaxially, with the driving force acting in a substantially axial direction and, in an axial area, which is rearward in direction of said driving force, said chamber is arranged radially inside thereof and said power transmitter being radially outside thereof, with said reservoir being arranged in front of a direction of relief.

12. The apparatus for continuously releasing a liquid over an adjustable period of time according to claim 8, wherein said reservoir, said chamber and said power transmitter are arranged in substantially coaxially, with the driving force acting in a substantially axial direction, with said power transmitter being arranged in a radially exterior area behind said chamber in a direction of the driving force with said chamber and said power transmitter surrounding said reservoir.

13. The apparatus for continuously releasing a liquid over an adjustable period of time according to claim 1, wherein said tube is arranged in a direction of said chamber's rear side, in a direction of the driving force, and said braking plunger displacing said side in a direction of said driving force.

14. The apparatus for continuously releasing a liquid over an adjustable period of time according to claim 13, wherein said chamber is formed as bellows on whose rear side, in a direction of the driving force, said brake plunger abuts.

15. The apparatus for continuously releasing a liquid over an adjustable period of time according to claim 13, wherein said chamber is formed by a piston and a cylinder, said piston being connected with said brake plunger and said cylinder being fixed.

16. The apparatus for continuously releasing a liquid over an adjustable period of time according to claim 13, wherein said chamber is formed by a piston and a cylinder, said piston is fixed and said cylinder is connected to said brake plunger.

17. The apparatus for continuously releasing a liquid over an adjustable period of time according to claim 1, wherein said power transmitter is a spring.

18. The apparatus for continuously releasing a liquid over an adjustable period of time according to claim 1, wherein the driving force for moving said movable working plunger is substantially constant over the entire movement of said movable working plunger.

19. The apparatus for continuously releasing a liquid over an adjustable period of time according to claim 1, wherein said tube is detachably attached to said chamber.

20. A method for manufacturing an apparatus for continuously releasing a liquid over an adjustable period of time, said apparatus comprising:

a reservoir for a liquid;

a movable working plunger for ejecting the liquid from said reservoir;

a brake plunger continuously applied for preventing a pre-determined amount of the liquid in said reservoir from being exceeded;

a tube capable of being cut therethrough;

a power transmitter for transmitting a driving force for moving said movable working plunger, said power transmitter being connected to said brake plunger for counteracting the driving force with a braking force by reducing the volume of a chamber filled with a paste-like liquid and ejecting the liquid therefrom; and, means for pressing said paste-like liquid through said tube, said method comprising the steps of:

manufacturing said tube with a maximum tube length; and, shortening said tube by cutting off a downstream front piece thereof.

21. A method for an adjustment of a discharge period of an apparatus for continuously releasing a liquid over an adjustable period of time, said apparatus comprising:

a reservoir for a liquid;

a movable working plunger for ejecting the liquid from said reservoir;

a brake plunger continuously applied for preventing a pre-determined amount of the liquid in said reservoir from being exceeded;

a tube capable of being cut therethrough;

a power transmitter for transmitting a driving force for moving said movable working plunger, said power transmitter being connected to said brake plunger for counteracting the driving force with a braking force by reducing the volume of a chamber filled with a paste-like liquid and ejecting the liquid therefrom; and, means for pressing said paste-like liquid through said tube, said method comprising the steps of:

removing said tube; and, replacing said tube with a new tube.

\* \* \* \* \*